United States Patent
Tsukimura

(10) Patent No.: US 8,023,022 B2
(45) Date of Patent: Sep. 20, 2011

(54) SOLID-STATE IMAGING APPARATUS

(75) Inventor: Mitsuhiro Tsukimura, Hachioji (JP)

(73) Assignee: Olympus Corporation, Tokyo (JP)

( * ) Notice: Subject to any disclaimer, the term of this patent is extended or adjusted under 35 U.S.C. 154(b) by 351 days.

(21) Appl. No.: 12/463,623

(22) Filed: May 11, 2009

(65) Prior Publication Data

US 2009/0284634 A1    Nov. 19, 2009

(30) Foreign Application Priority Data

May 13, 2008   (JP) .................................. 2008-125399
May 13, 2008   (JP) .................................. 2008-125400

(51) Int. Cl.
   *H04N 5/335*    (2006.01)
(52) U.S. Cl. ........................................ 348/300; 348/308
(58) Field of Classification Search ................ 348/294, 348/300, 308; 257/290, 291, 292, 293; 250/208.1
   See application file for complete search history.

(56) References Cited

U.S. PATENT DOCUMENTS 7,623,173 B2 * 11/2009 Nitta et al. ..................... 348/302
2009/0225211 A1 * 9/2009 Oike ............................. 348/308

FOREIGN PATENT DOCUMENTS

JP       2000-287131 A     10/2000
JP       2007-20156 A      1/2007

* cited by examiner

*Primary Examiner* — Hung Dang
(74) *Attorney, Agent, or Firm* — Westerman, Hattori, Daniels & Adrian, LLP

(57) ABSTRACT

A solid-state imaging apparatus, comprising: a pixel section including a matrix having a plurality of pixels, each pixel including photoelectric conversion means, a storage section, transfer means, amplification means, and reset means, on a column basis, an output signal line whose one end is coupled to a constant-current source, and in which the area carrying thereon the matrix of the pixels includes a light-shielding area, a read area, and a transition area disposed between the light-shielding area and the read area; and control means for performing control to keep the potential difference between the one end and the other end of the constant-current source in a range with which the constant-current source can be operated by using the pixel signal to be output to the output signal line at the time of resetting the pixel of the transition area, when outputting the pixel signal corresponding to the incident light from the pixel of the read area.

10 Claims, 12 Drawing Sheets

HIGH-LUMINANCE LIGHT

BLACK SUN PHENOMENON DUE TO RESET POTENTIAL CHANGE

TRANSVERSE STRIPE (HIGHLIGHT TRANSVERSE STRIPE) PHENOMENON DUE TO SIGNAL POTENTIAL CHANGE

HIGHLIGHT TRANSVERSE STRIPE PHENOMENON + BLACK SUN PHENOMENON

SOLID-STATE IMAGING APPARATUS

This application claims benefit of Japanese Patent Applications No. 2008-125399 filed in Japan on May 13, 2008 and No. 2008-125400 filed in Japan on May 13, 2008, the contents of which are incorporated by these references.

BACKGROUND OF THE INVENTION

The present invention relates to a solid-state imaging apparatus for use in a camcorder, a digital still camera, and others and, more specifically, to a solid-state imaging apparatus using an amplified solid-state imaging device that has an amplifier capability in an imaging area.

Imaging apparatuses such as digital cameras have recently started using MOS (Metal Oxide Semiconductor) image sensors. The MOS image sensors each have an active element in a pixel as an imaging device, thereby allowing on-chip peripheral circuits. FIG. 1 shows the circuit configuration of a MOS image sensor of a general type. The general MOS image sensor usually carries a plurality of pixels arranged two dimensionally, but for simplification, FIG. 1 shows only three pixels P11, P12, and P13 arranged in a row. These pixels P11, P12, and P13 are configured to each include a photodiode PD, a transfer transistor M1, a reset transistor M2, and a selection transistor M4, and respectively include floating diffusion sections FD11, FD12, and FD13, and amplification transistors M311, M312, and M313. The floating diffusion sections FD11, FD12, and FD13 are those each having a capacitance. The pixels P11, P12, and P13 are coupled to each corresponding correlated double sampling circuit (CDS circuit) 10 respectively via vertical signal lines 31, 32, and 33. The vertical signal lines 31, 32, and 33 are respectively coupled to bias transistors M51, M52, and M53 at their each one end. The bias transistors M51, M52, and M53 each serve as a constant-current source with their other ends being-grounded. These bias transistors M51, M52, and M53 are under the control of a bias current adjusting voltage Vbias.

The CDS circuits 10 are each configured to include a clamp transistor M11, a sample hold transistor M12, a clamp capacitor C11, and a sample hold capacitor C12. The CDS circuits 10 are coupled to a horizontal signal line 7 via their corresponding column selection transistors M6, and are so configured as to output image signals via an output amplifier 5. Various types of pulses are provided respectively from a vertical scanning section 2 and a horizontal scanning section 4 under the control of a timing control section 6. The various types of pulses include a transfer pulse φTR1, a reset pulse φRST1, and a row selection pulse φROW1, which are respectively related to the control of the transistors in each of the pixels, i.e., the transfer transistor M1, the reset transistor M2, and the selection transistor M4. The various types of pulses also include column selection pulses φH1, φH2, and φH3, which are related to the control of the column selection transistors M6. Other pulses related to the control of the clamp transistor M11 and the sample hold transistor M12, i.e., a clamp pulse φCL, and a sample hold pulse φSH, are to be output from the timing control section 6.

The MOS image sensor configured as above suffers from image quality deterioration due to the varying threshold value of the amplification transistors M311 to M313, and the reset noise of the reset transistor M2 in every pixel. However, such noise can be removed by finding a pixel-output difference in each of the CDS circuits 10, i.e., a difference between the pixel output after the resetting and the pixel output after the transferring of the signal charges of the photodiode PD. With the noise favorably removed as such, only optical signals serving as image signals can be output.

The MOS image sensor provided with the CDS circuits is known to generate, when a high-luminance light enters thereinto, a completely black image that looks like a result of no entry of light. Such a phenomenon is hereinafter referred to as black sun phenomenon. Described next is such a black sun phenomenon in the MOS image sensor. FIG. 2 is a timing chart for illustrating the operation of causing the black sun phenomenon when a high-luminance object is imaged. Exemplified here is a case where a high-luminance light is being directed to the center pixel P12 of FIG. 1, but a light is hardly entered to the remaining pixels P11 and P13.

(1) First of all, in a reset period T1, when a row selection pulse φROW1 is in the state of H (High) level, a reset pulse φRST1 is set to the H level, and the floating diffusion sections FD11, FD12, and FD13 of each pixel are fixed to a power supply voltage VDD. In the CDS circuits 10, a clamp pulse φCL and a sample hold pulse φSH are both set to the H level.

(2) In the next reset sampling period T2, the reset pulse φRST1 is set to the L (Low) level. In this period, in the pixels P11 and P13 not being exposed to a high-luminance light, the floating diffusion sections FD11 and FD13 respectively show no change of their voltages VFD11 and VFD13 (VFD13 is not shown), but in the pixel P12 being exposed to a high-luminance light, the floating diffusion section FD12 drops its voltage VFD12 as shown in the drawing due to the leakage of charge from the photodiode PD, for example. This resultantly causes the reduction of a potential V32(Rst) of the vertical signal line 32 that is coupled with the pixel P12, thereby deriving (VFD12−VGS-M312). Note here that this term of VGS-M312 denotes the gate-source voltage of the amplifier transistor M312 of the pixel P12. At the end of the reset sampling period T2, the potential of each of the vertical signal lines 31 to 33 are clamped with the clamp pulse φCL being set to the L level in the CDS circuits 10.

(3) In the following signal transfer period T3, with a transfer pulse φTR1 being set to the H level, the signal charges of the photodiode PD in each of the pixels P11 to P13 are transferred to their corresponding floating diffusion sections FD11 to FD13. At this time, the voltage VFD12 of the floating diffusion section FD12 in the pixel P12 being exposed to the high-luminance light is already reduced in the reset sampling period T2. Therefore, even if the charges of the photodiode PD are transferred, the resulting voltage change is not that much from the value in the reset sampling period T2, i.e., no voltage change is observed when the voltage VFD12 of the floating diffusion section FD12 has reached its bottom value due to the leakage of charge. As a result, the vertical signal 32 also shows a slight change of the potential V32(Sig). Note here that, at this time, because the pixels P11 and P13 are assumed as being hardly exposed to a light, the remaining vertical signal lines 31 and 33 also hardly show a change of potential.

(4) In the following signal sampling period T4, with the processing operation of the CDS circuits 10, the potential difference [V32(Rst)−V32(Sig)] is retained at the sample hold capacitor C12. The potential difference being the processing result in each of the CDS circuits 10 are output as image signals via the column selection transistors M6 and the output amplifier 5. At this time, in the pixel P12 being exposed to the high-luminance light, a black sun phenomenon is observed due to the variation of the potential V32(Rst) of the vertical signal line 32 in the reset sampling period T2, i.e., the potential difference [V32(Rst)−V32(Sig)] being the CDS processing result is small, and thus the output looking black is output as an image signal.

Such a problem of black sun phenomenon can be solved with still image shooting if a mechanical shutter is provided. However, with moving image shooting not using a mechanical shutter, for example, the black sun phenomenon is inevitable.

There is another concern that the entering of the high-luminance light may affect any pixel areas other than the pixel being exposed thereto. FIG. 3 is a timing chart for illustrating the operation of causing a highlight transverse stripe phenomenon to be observed around the pixel being exposed to a high-luminance light. Exemplified here is also a case where a high-luminance light is being directed to the center pixel P12 of FIG. 1, but a light is hardly entered to the remaining pixels P11 and P13. This example is with an assumption that no black sun phenomenon is to be observed.

(1) First of all, in the reset period T1, similarly, when a row selection pulse φROW1 is in the state of H level, a reset pulse φRST1 is set to the H level, and the voltages of the floating diffusion sections FD11, FD12, and FD13 of each of the pixels, i.e., voltages VFD11 to VFD13, are all fixed to the power supply voltage VDD. In the CDS circuits 10, a clamp pulse φCL and a sample hold pulse φSH are both set to the H level.

(2) In the next reset sampling period T2, at the end thereof, the clamp pulse φCL is set to the L level in the CDS circuits 10, and the voltages of the floating diffusion sections FD11 to FD13 of each of the pixels are clamped to the CDS circuits 10 respectively via the vertical signal lines 31 to 33.

(3) In the following signal transfer period T3, with a transfer pulse φTR1 being set to the H level, the signal charges of the photodiode PD in each of the pixels P11 to P13 are transferred to their corresponding floating diffusion sections FD11 to FD13. At this time, the voltage VFD12 of the floating diffusion section FD12 in the pixel P12 being exposed to the high-luminance light is largely reduced from the power supply voltage VDD due to the large amount of signal charges therein. Therefore, the potential V32 of the vertical signal line 32 coupled with the pixel P12 is largely reduced down to (VFD12−VGS-M312). This accordingly reduces the drain-source voltage of the bias transistor M52 coupled to the vertical signal line 32, thereby reducing the current flowing to the bias transistor M52. This reduction of the current thus reduces any possible voltage drop to be caused by the GND resistance of a GND line coupled to all of the sources of the bias transistors M51 to M53 so that the gate-source voltage is increased in the bias transistors M51 and M53 respectively coupled to the vertical signal lines 31 and 33. As a result, the current flowing to the vertical signal lines 31 and 33 is increased. This increase of the current then increases the gate-source voltage in the amplification transistors M311 and M313 of the pixels P11 and P13, respectively, so that the potentials V31 and V33 of the vertical signal lines 31 and 33 will be in the level lower by ΔV than the reset level output (VDD).

(4) In the following signal sampling period T4, with the processing operation of the CDS circuits 10, the difference between the reset potential and the optical-signal-reading potential after the transferring of the signal charges in the vertical signal lines 31 to 33 is output as an image signal via the column selection transistors M6 and the output amplifier 5. At this time, in the pixels P11 and P13 in the vicinity of the pixel P12 being exposed to the high-luminance light, the potential difference ΔV from the reset level is detected due to the variation of the current via the GND line coupled to the bias transistor M52 as described above. Thus detected potential difference ΔV will look a white float-like image, thereby causing the highlight transverse stripe phenomenon in the image signal.

In the MOS image sensor as such, when a window chart is imaged, such images as shown in FIGS. 4A to 4D may be derived due to the black sun phenomenon and the highlight transverse stripe phenomenon. FIG. 4A shows the pattern of an object with a high-luminance light at the center, and FIG. 4B shows the state in which the black sun phenomenon is observed due to the variation of the reset potential. FIG. 4C shows the state in which the highlight transverse stripe phenomenon is observed due to the variation of the signal potential, and FIG. 4D shows the state in which the black sun phenomenon is observed together with the highlight transverse stripe phenomenon.

JP-A-2007-20156 describes the previous technique as below not to cause the black sun phenomenon and the highlight transverse stripe phenomenon in the MOS image sensor described above. That is, with the technique, as shown in FIG. 5, clipping circuits 71 to 73 are provided respectively to the vertical signal lines 31 to 33 to selectively restrict the potentials thereof to be the value of a first or second potential. With such a configuration, the pixel output after the resetting of the pixels is so controlled as not to be the value of the first potential or lower, and the pixel output after the transferring of the signal charges is so controlled as not to be the value of the second potential or lower. Note here that the clipping circuits 71 to 73 are respectively configured to include clipping transistors M71 to M73, and clipping selection transistors M81 to M83. In the configuration, the gates of the clipping transistors M71 to M73 are coupled to a clipping voltage Vclip, and the drains thereof are coupled to the power supply voltage VDD. The gates of the clipping selection transistors M81 to M83 are applied with a clipping selection pulse φROWD, and the sources thereof are respectively coupled to the vertical signal lines 31 to 33. The clipping voltage Vclip and the clipping selection pulse φROWD are to be output from the timing control circuit 6.

Described next is the operation of the MOS image sensor provided with the clipping circuits as in the above configuration by referring to the timing chart of FIG. 6. Exemplified also here is a case where a high-luminance light is being directed to the center pixel P12 of FIG. 5, but a light is hardly entered to the remaining pixels P11 and P13 therearound.

(1) First of all, in the reset period T1, a row selection pulse φROW1 is set to the H level, and the clipping voltage Vclip is set to a first level VclipH, i.e., the level being lower than the power supply voltage VDD but not causing the black sun phenomenon. A reset pulse φRST1 is set to the H level, and the floating diffusion sections FD11, FD12, and FD13 of each of the pixels are fixed to the power supply voltage VDD. In the CDS circuits 10, a clamp pulse φCL and a sample hold pulse φSH are both set to the H level.

(2) In the next reset sampling period T2, in the pixel P12 being exposed to a high-luminance light, the floating diffusion section FD12 shows a considerable reduction of its voltage VFD12 due to the leakage of charge from the photodiode PD, for example. As a result, when there is no clipping circuit provided, the potential V32 of the vertical signal line 32 is also reduced to a considerable degree. In this example, however, with the clipping circuit 72 provided, the potential V32 (Rst) of the vertical signal line 32 will not be reduced to or below the potential of (VclipH−VGS-M72) as is clipped thereto. This accordingly prevents any possible black sun phenomenon from occurring also by the differential processing to be executed next by the CDS circuits 10. Note here that the term of VGS-M72 denotes the gate-source voltage of the clipping transistor M72. At the end of the reset sampling period T2, the potentials of the vertical signal lines 31 to 33 are clamped with the clamp pulse φCL being in the L level in the CDS circuits 10.

(3) In the following signal transfer period T3, the level of the clipping voltage Vclip is changed to a second level VclipL in which no highlight transverse stripe phenomenon is to be caused, and by setting the transfer pulse φTR1 to the H level, the charges of the photodiode PD in each of the pixels P11 to P13 are transferred to the corresponding floating diffusion sections FD11 to FD13. At this time, the voltage VFD12 of the floating diffusion section FD12 in the pixel P12 being exposed to the high-luminance light is largely reduced. As such, when there is no clipping circuit provided, the potential V32 of the vertical signal line 32 is also largely reduced, and the drain-source voltage of the bias transistor M51 is reduced down to a value outside of the range of operating the bias transistor M51, thereby causing highlight transverse stripe. However, if the voltage of the clipping circuit, i.e., voltage VDD2, is set to the second clipping level VclipL, the voltage V32 of the vertical signal line 32 will not down to or below the value of (VclipL–VGS-M72) as is clipped thereto, thereby operating the bias transistor M51. This accordingly prevents any possible highlight transverse stripe from occurring.

(4) In the following signal sampling period T4, with the processing operation of the CDS circuits 10, the potential difference of the vertical signal lines 31 to 33, i.e., the difference between the reset potential and the optical-signal-reading potential after the transferring of the signal charges, is retained at the sample hold capacity C12. The potential difference is then output, via the column selection transistors M6 and the output amplifier 5, as an image signal free from the black sun phenomenon and the highlight transverse stripe phenomenon.

As described above, with the clipping circuits provided as such, any possible black sun phenomenon and highlight transverse stripe phenomenon can be both favorably prevented.

SUMMARY OF THE INVENTION

A first aspect of the invention is directed to a solid-state imaging apparatus including a pixel section and a control means, the pixel section having a two-dimensional matrix of a plurality of pixels each provided with: photoelectric conversion means for converting an incident light into a signal charge; a storage section that stores therein the signal charge; transfer means for transferring the signal charge to the storage section; amplification means for amplifying the signal charge stored in the storage section for output as a pixel signal; and reset means for resetting the storage section through supply of a potential retained at a reset line to the storage section. The pixel section also includes, on a column basis, an output signal line whose one end is coupled to one end of a constant-current source whose remaining end is grounded, and through which the pixel signal is output. In the pixel section, the area carrying thereon the two-dimensional matrix of the pixels includes a light-shielding area with light shielding properties, a read area for reading a pixel signal corresponding to the incident light, and a transition area disposed between the light-shielding area and the read area. The control means selects any of the pixels being coupled to the same output signal line and being in the read area as a first pixel, and selects any of the pixels being coupled to said the same output signal line and being in the transition area as a second pixel. The control means then resets the second pixel by the reset means when outputting the pixel signal corresponding to the incident light from the first pixel to the output signal line. Using the pixel signal to be output at this time to the output signal line from the second pixel, the control means performs control to keep the potential difference between the one end and the other end of the constant-current source in a range with which the constant-current source can be operated.

In a second aspect of the invention, in the solid-state imaging apparatus of the first aspect, the control means uses the pixel signal from a plurality of the second pixels to perform the control over the constant-current source to keep the potential difference thereof in the range.

In a third aspect of the invention, in the solid-state imaging apparatus of the second aspect, the control means performs control to change the combination of the plurality of the second pixels for use to keep the potential difference of the constant-current source in the range.

In a fourth aspect of the invention, in the solid-state imaging apparatus of the first aspect, the control means also uses a pixel signal from the first pixel that is not a read target from the read area for the pixel signal corresponding to the incident light to perform the control over the constant-current source to keep the potential difference thereof in the range.

In a fifth aspect of the invention, in the solid-state imaging apparatus of the first aspect, the control means controls the second pixel outputting the pixel signal to make the potential difference between the one end and the other end of the constant-current source to be a lower limit of the range with which the constant-current source can be operated.

A sixth aspect of the invention is directed to a solid-state imaging apparatus including a pixel section, a noise suppression circuit, and control means, the pixel section having a two-dimensional matrix of a plurality of pixels each provided with: photoelectric conversion means for converting an incident light into a signal charge; a storage section that stores therein the signal charge; amplification means for amplifying the signal charge stored in the storage section for output as a first output signal to a signal output line; and reset means for resetting the storage section through supply of a reset potential supplied to a reset line to the storage section. In the pixel section, the area carrying thereon the two-dimensional matrix of the pixels includes a light-shielding area with light shielding properties, a read area for deriving the first output signal corresponding to the incident light, and a transition area disposed between the light-shielding area and the read area. The noise suppression circuit calculates a difference between the first output signal and a second output signal being an output to the signal output line as a result of a reset operation by the reset means in the same pixel outputting the first output signal, and performs a noise suppression operation to suppress any noise found in the first output signal. The control means performs control to set a lower limit value for the second output signal on the signal output line using a third output signal being an output to the signal output line as a result of the reset operation by the reset means in the second pixel found in the transition area coupled to the signal output line same as that for the first pixel, at the time of outputting the second output signal related to the first pixel included in the read area.

In a seventh aspect of the invention, in the solid-state imaging apparatus of the sixth aspect, the control means plurally sets the second pixel for use as the second pixel.

In an eighth aspect of the invention, in the solid-state imaging apparatus of the seventh aspect, the control means plurally sets the second pixel satisfying any predetermined requirements.

In a ninth aspect of the invention, in the solid-state imaging apparatus of the sixth aspect, the control means sets the lower limit value for the second output signal on the signal output line also using a fourth output signal being an output to the signal output line as a result of the reset operation by the reset means in the first pixel that is included in the read area but is not a read target.

In a tenth aspect of the invention, in the solid-state imaging apparatus of the sixth aspect, the control means sets a potential of the third output signal to be lower than a potential of the second output signal.

DESCRIPTION OF THE PREFERRED EMBODIMENTS

Described next are some embodiments of the solid-state imaging apparatus of the invention by referring to the accompanying drawings.

Embodiment 1

Figure 7:
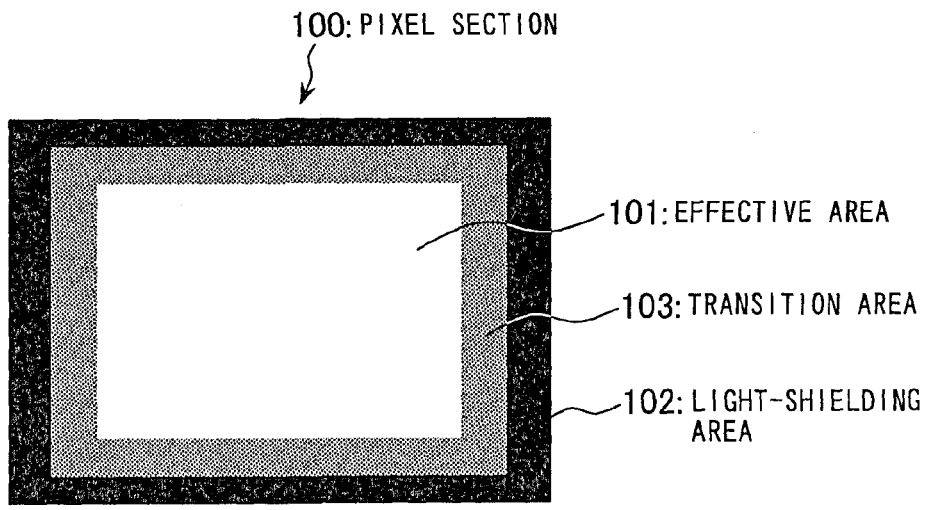
FIG. 7 is a diagram showing an effective area, a light-shielding area, and a transition area therebetween in a general pixel section in a solid-state imaging apparatus.

The invention is aimed to enable the clipping operation for vertical signal lines with no need to separately provide a clipping circuit but using a pixel output from a pixel section to prevent a black sun phenomenon and a highlight transverse stripe phenomenon. In a first embodiment, the clipping operation uses the pixel output specifically from a transition area in the pixel section. That is, as shown in FIG. 7, in a pixel section 100, the center portion generally serves as an effective area 101 for forming an image signal, and the remaining peripheral portion serves as a light-shielding area 102 for outputting the black level. Between the effective area 101 and the light-shielding area 102, formed is a transition area (margin area) 103, which is not used for deriving an image signal in view of the quality thereof. In this embodiment, the clipping operation is performed using pixels included in this transition area 103.

Figure 1:
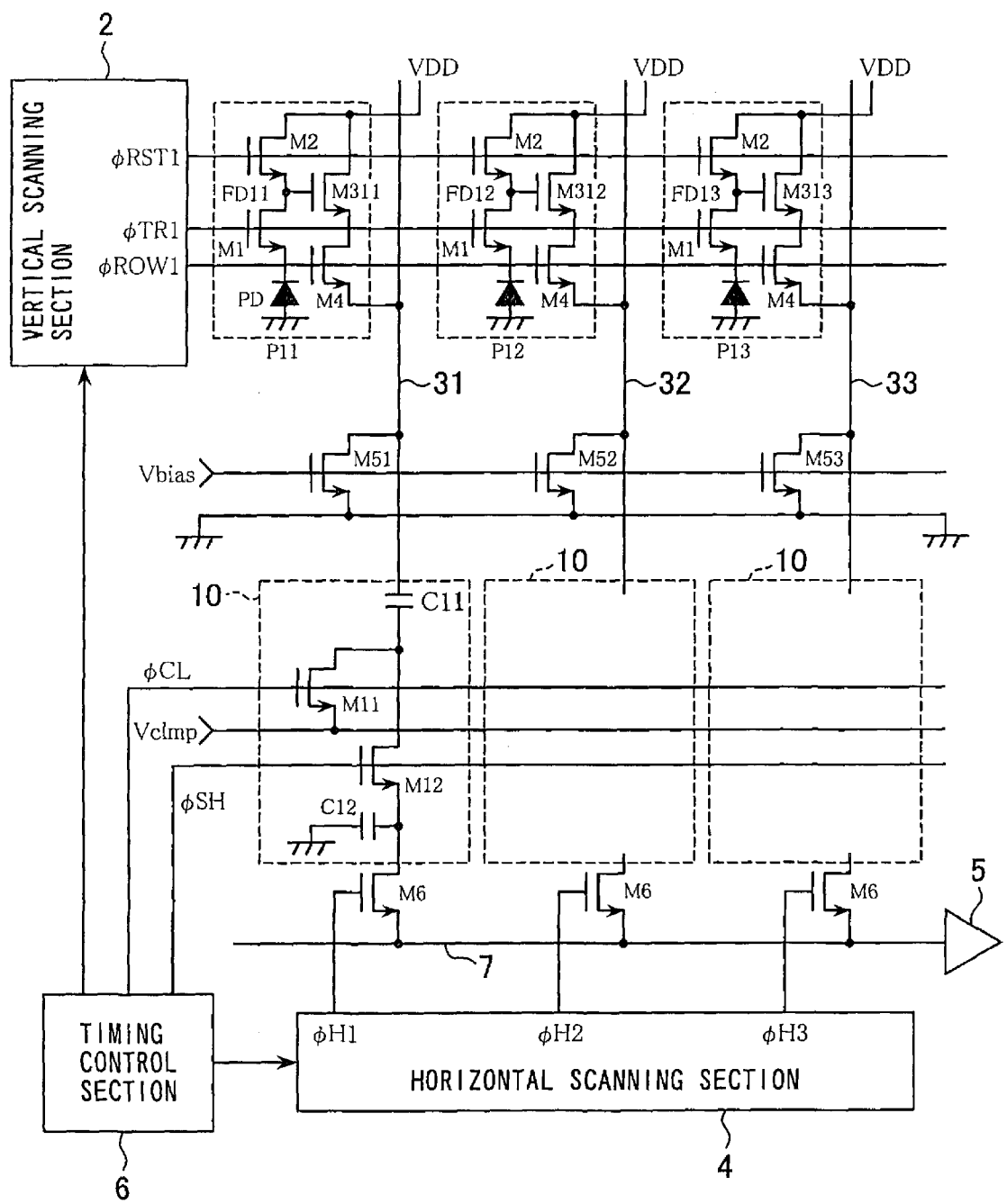
FIG. 1 is a circuit configuration diagram of a general MOS image sensor.
Figure 2:
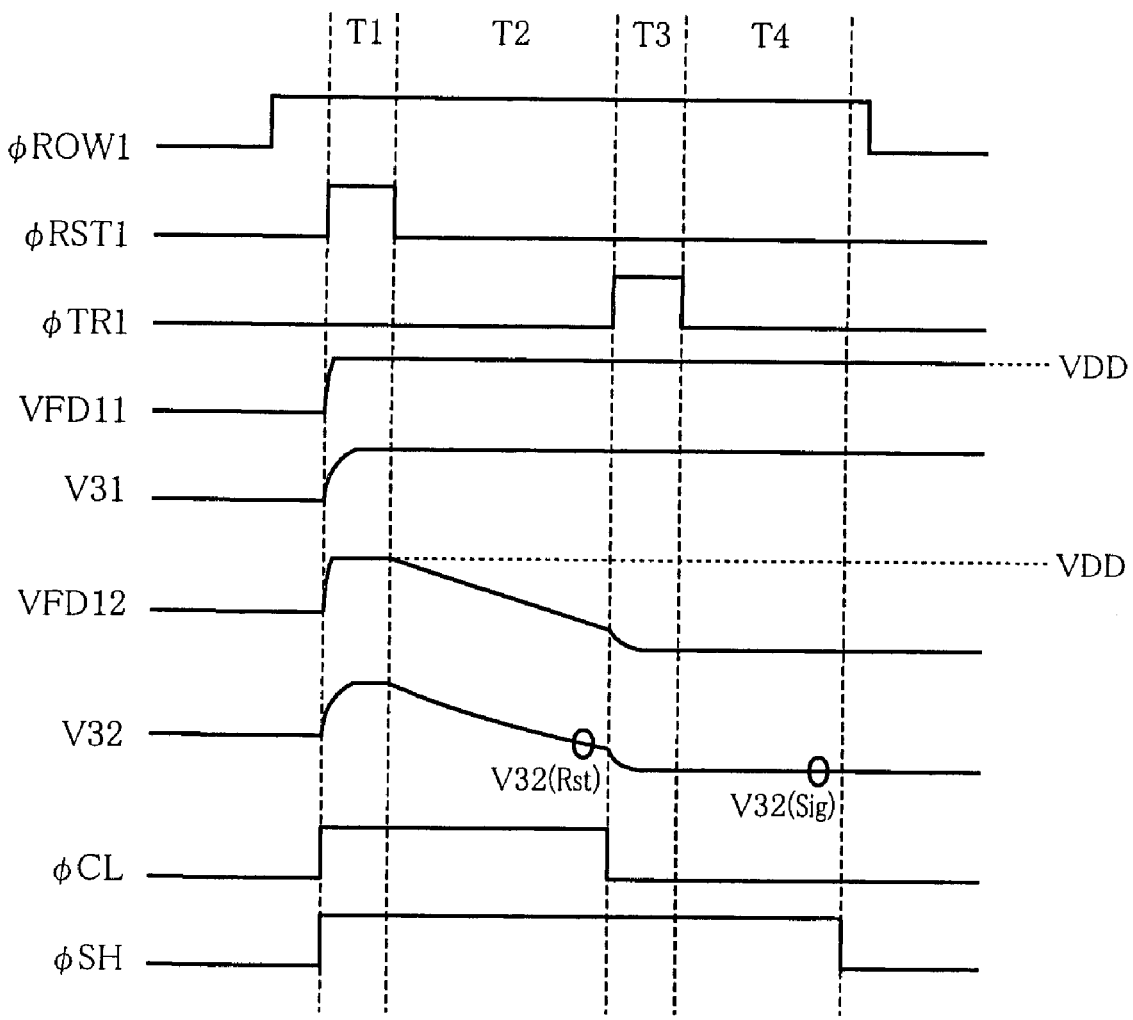
FIG. 2 is a timing chart for illustrating the state of the MOS image sensor of FIG. 1 in which a black sun phenomenon is observed.
Figure 3:
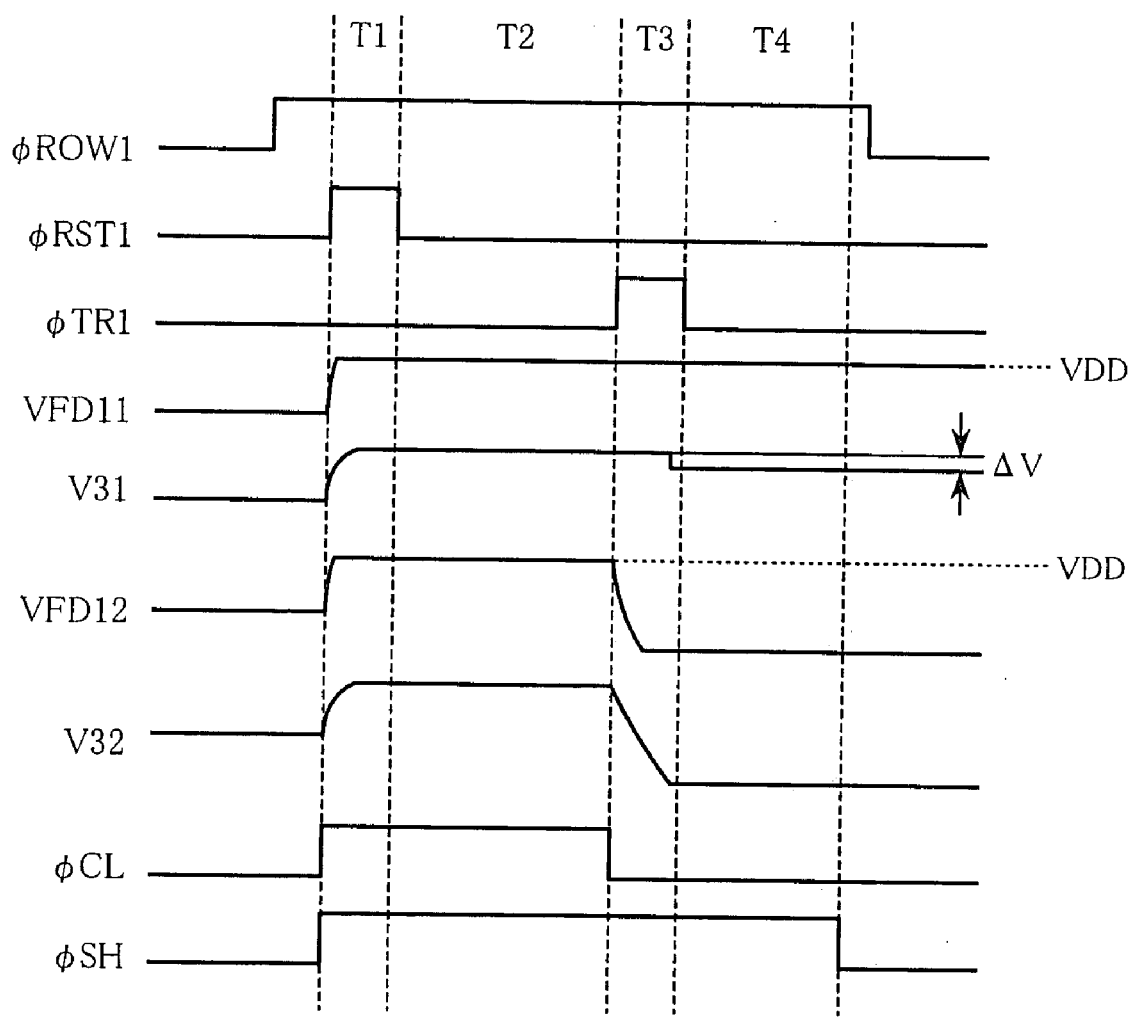
FIG. 3 is a timing chart for illustrating the state of the MOS image sensor of FIG. 1 in which a highlight transverse stripe phenomenon is observed.
Figure 4A:
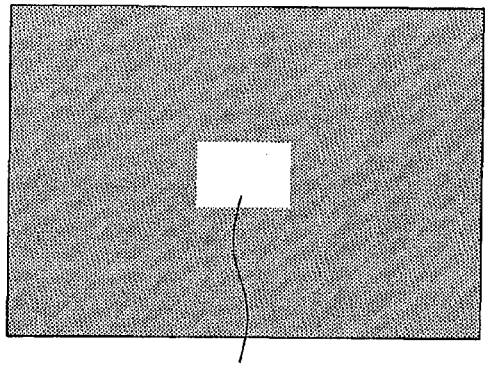
FIGS. 4A to 4D are each a schematic diagram showing an object pattern with a high-luminance light at the center, and the state in which the black sun phenomenon and/or the highlight transverse stripe phenomenon is observed in the MOS image sensor of FIG. 1.
Figure 4B:
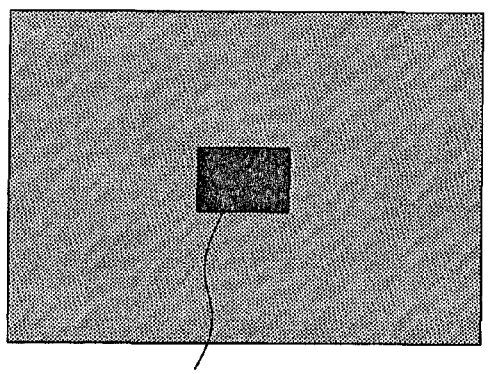
Figure 4C:
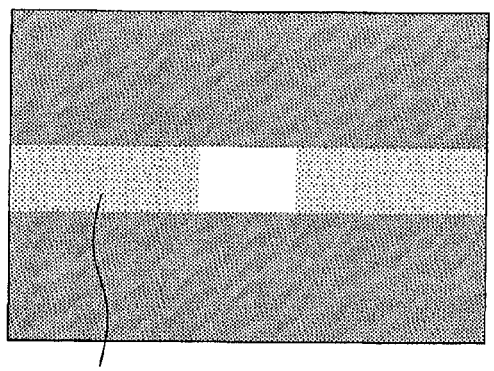
Figure 4D:
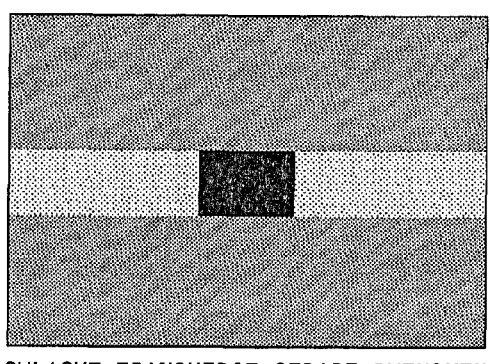
Figure 5:
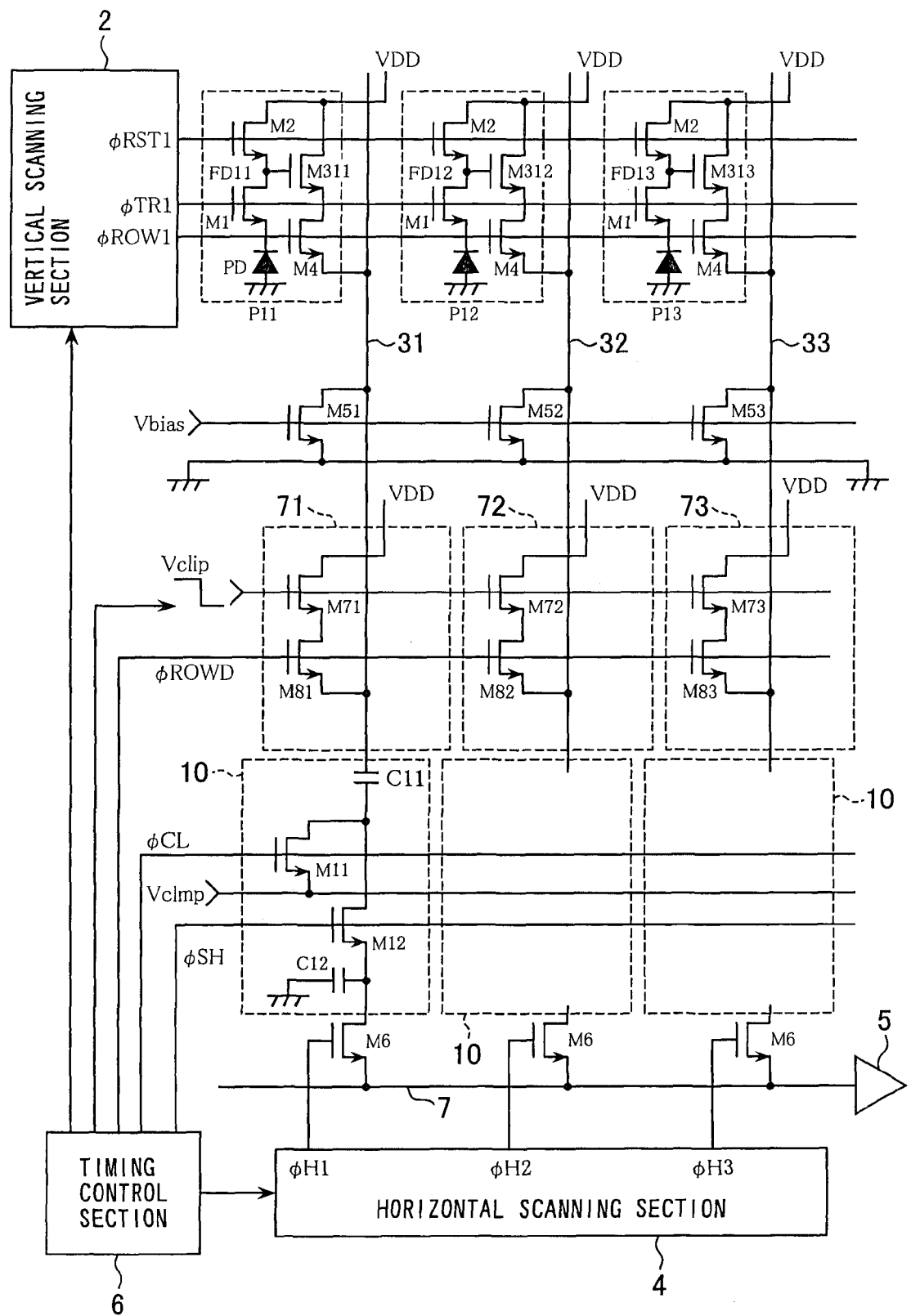
FIG. 5 is a circuit configuration diagram of a previous MOS image sensor provided with clipping circuits.
Figure 6:
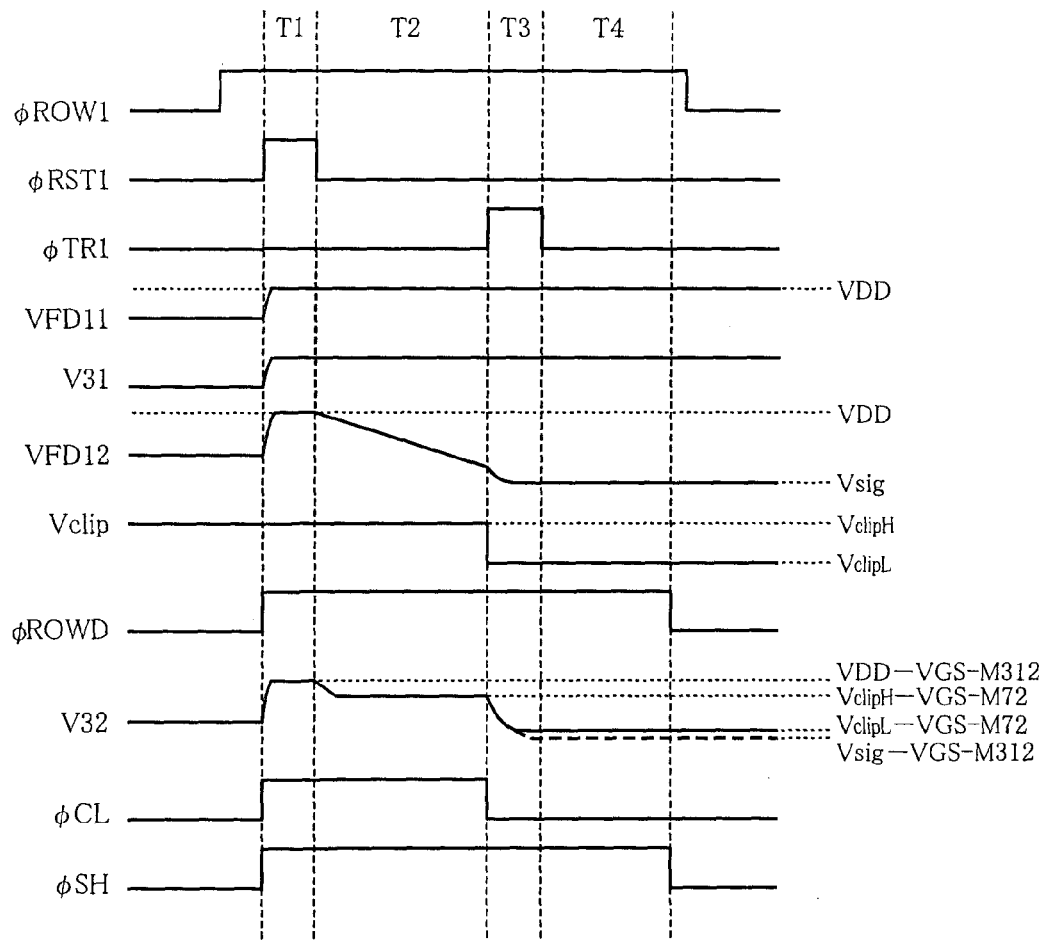
FIG. 6 is a timing chart for illustrating the operation of the MOS image sensor of FIG. 5.
Figure 8:
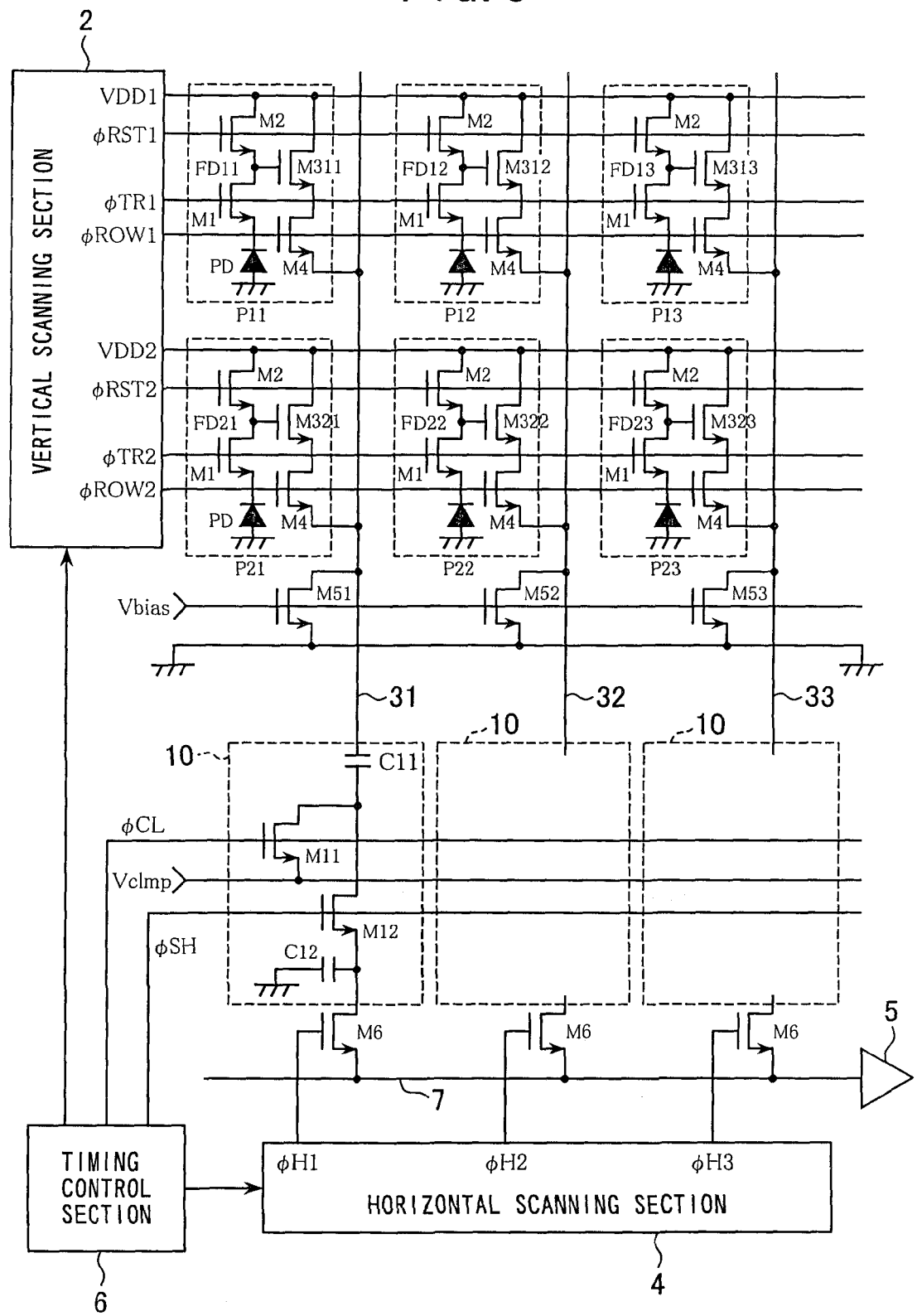
FIG. 8 is a circuit configuration diagram of a solid-state imaging apparatus in a first embodiment of the invention.

Described next is the specific configuration of the first embodiment. FIG. 8 is a circuit configuration diagram of the solid-state imaging apparatus of the first embodiment. In FIG. 8, any component similar to or corresponding to that in the previous solid-state imaging apparatus of FIG. 1 is provided with the same reference numeral, and is not fully described again. Also in the solid-state imaging apparatus of this embodiment, a pixel section is configured by a plurality of pixels arranged two dimensionally, but for simplicity, FIG. 8 shows only pixels P11 to P13 and P21 to P23, arranged three each in two rows. The pixels P11 to P13 in the first row are those in the effective area, and the pixels P21 to P23 in the second row are those in the transition area. These pixels P11 to P23 are configured to each include a photodiode PD, a transfer transistor M1, a reset transistor M2, and a selection transistor M4, and respectively include floating diffusion sections FD11 to FD 13 and FD21 to FD23, and amplification transistors M311 to M313 and M321 to M323. The floating diffusion sections FD11 to FD23 are those each having a capacitance. Three pairs of the pixels P11 to P23 arranged in the column direction are respectively coupled to the vertical signal lines 31, 32, and 33, and the vertical signal lines 31 to 33 are coupled to each corresponding CDS circuit 10. The vertical signal lines 31 to 33 are respectively coupled to the bias transistors M51 to M53 at their each one end. The bias transistors M51 to M53 each serve as a constant-current source with their other ends being grounded. These bias transistors M51 to M53 are under the control of a bias current adjusting voltage Vbias.

The CDS circuits 10 are each configured to include a clamp transistor M11, a sample hold transistor M12, a clamp capacitor C11, and a sample hold capacitor C12. The CDS circuits 10 are coupled to the horizontal signal line 7 via their corresponding column selection transistors M6, and are so configured as to output image signals via the output amplifier 5. Various types of pulses are provided respectively from the vertical scanning section 2 and the horizontal scanning section 4 under the control of the timing control section 6. The various types of pulses include transfer pulses φTR1 and φTR2, reset pulses φRST1 and φRST2, and row selection pulses φROW1 and φROW2, which are respectively related to the control of the transistors in each of the pixels, i.e., the transfer transistor M1, the reset transistor M2, and the selection transistor M4. The various types of pulses also include column selection pulses φH1 to φH3, which are related to the control of the column selection transistor M6. A pixel power supply VDD1 for the pixels P11 to P13 in the first row are fixed to the power supply voltage VDD. On the other hand, a pixel power supply VDD2 for the pixels P21 to P23 in the second row is to be changed between first and second clipping voltages VclipH and VclipL by the timing control section 6 via the vertical scanning section 2. The first clipping voltage VclipH is slightly lower than the power supply voltage VDD, and a black sun phenomenon does not occur therewith. The second clipping voltage VclipL is lower than the first clipping voltage VclipH, and a highlight transverse stripe phenomenon does not occur therewith. Other pulses related to the control of the clamp transistor M11 and the sample hold transistor M12, i.e., a clamp pulse φCL, and a sample hold pulse φSH, are to be output from the timing control section 6.

Figure 9:
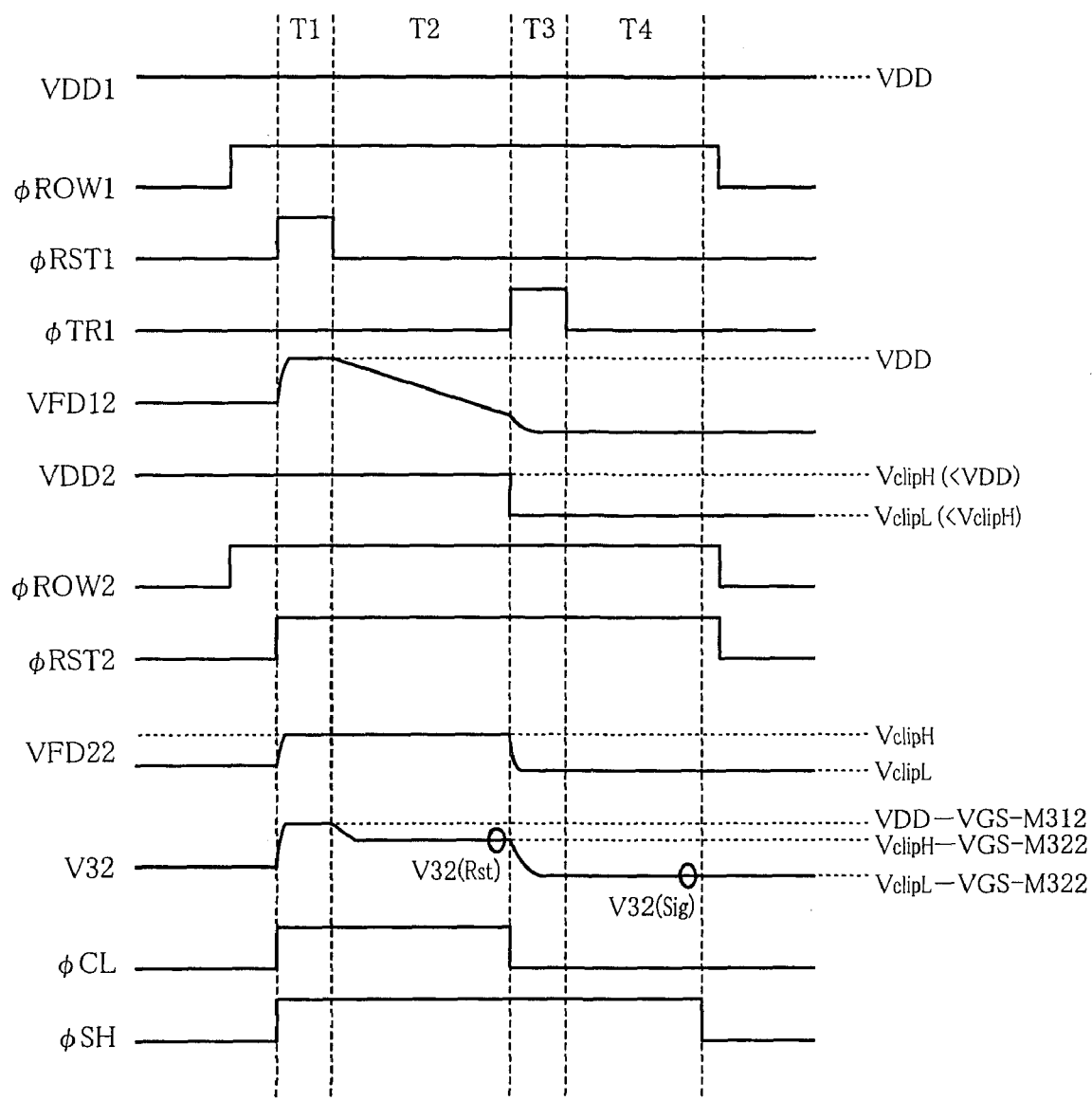
FIG. 9 is a timing chart for illustrating the operation of the solid-state imaging apparatus of the first embodiment of FIG. 8.

Described next is the operation of the solid-state imaging apparatus of the first embodiment configured as such by referring to the timing chart of FIG. 9. Exemplified here is a case where a high-luminance light is being directed to the center pixel P12 of FIG. 8, but a light is hardly entered to the remaining pixels. The operation of the second pixel column is mainly described.

(1) First of all, in an FD-section reset period T1, with the two row selection pulses φROW1 and φROW2 being in the H level, pixel outputs of the two rows are coupled to the vertical signal line 32, thereby configuring the differential input circuit. The pixel power supply VDD2 of the second row is being set to the first clipping voltage VclipH. In this state, the two row reset pulses φRST1 and φRST2 are both set to the H level so that the voltage VFD12 of the floating diffusion section FD12 of the pixel P12 in the first read row is fixed to the power supply voltage VDD, and the voltage VFD 22 of the floating diffusion section FD22 of the pixel P22 in the second row for generation of the clipping voltage is fixed to the first clipping voltage VclipH. With the voltages being fixed as such, the potential V32 of the vertical signal line 32 becomes (VDD−VGS-M312). In the CDS circuits 10, the clamp pulse φCL and the sample hold pulse φSH are also set to the H level.

(2) In the next reset sampling period T2, the reset pulse φRST2 in the second row is remained in the H level, and the reset pulse φRST1 in the first row is set to the L level. In the pixel P12 in the first row, the floating diffusion section FD12 drops its voltage VFD12 as shown in the drawing due to the leakage of charge or others from the photodiode PD as a result of the entering of the high-luminance light. On the other hand, because the reset pulse φRST2 remains in the H level in the pixel P22 in the second row for generation of the clipping voltage, the voltage VFD22 of the floating diffusion section FD22 remains fixed to the first clipping voltage VclipH. Accordingly, the potential V32(Rst) of the vertical signal 32 is clipped to (VclipH−VGS-M322), thereby favorably preventing a black sun phenomenon from being caused due to the next differential processing to be executed by the CDS circuits 10. Note here that the term of VGS-M322 denotes the gate-source voltage of the amplification transistor M322 of the pixel P22. At the end of the reset sampling period T2, the potential V32(Rst) (=VclipH−VGS-M322) of the vertical signal line 32 is clamped with the clamp pulse φCL being set to the L level in the CDS circuits 10.

(3) In the following signal transfer period T3, with the reset pulse φRST2 of the clipping-voltage-generation pixel in the second row being remained in the H level, the transfer pulse φTR1 in the first pixel row is set to the H level. This further reduces the voltage VFD12 of the floating diffusion section FD12 in the pixel P12 in the first row (read row) by the storage charges of the photodiode PD. The pixel power supply VDD2 of the clipping-voltage-generation pixel P22 in the second row is changed to the second clipping voltage VclipL, and then the voltage VFD22 of the floating diffusion section FD22 of the pixel P22 is changed and fixed to the second clipping voltage VclipL.

(4) In the following signal sampling period T4, with the reset pulse φRST2 in the second pixel row being remained in the H level, the transfer pulse φTR1 in the first pixel row is set to the L level. In this stage, the voltage VFD12 of the floating diffusion section FD12 in the pixel P12 in the first row is reduced down to the level of causing highlight transverse stripe, but the potential V32(Sig) of the vertical signal line 32 is clipped to (VclipL−VGS-M322) because the voltage VFD22 of the floating diffusion section FD22 of the clipping-voltage-generation pixel P22 in the second row is being fixed to the second clipping voltage VclipL. This accordingly enables to prevent any possible variation of the current of the vertical signal line 32, thereby being able to prevent the highlight transverse stripe phenomenon.

With the processing operation of the CDS circuits 10, the potential difference of the vertical signal lines 31 to 33, i.e., the difference between the reset potential and the optical-signal-reading potential after the transferring of the signal charge, is retained at the sample hold capacitor C12. The potential difference is then output, via the column selection transistors M6 and the output amplifier 5, as an image signal free from the black sun phenomenon and the highlight transverse stripe phenomenon. In the below, the operation is repeated similarly while changing the read rows and the clipping-voltage-generation rows so that the image signals of one frame can be derived.

As described above, in this embodiment, the potential V32 (VFD12−VGS-M312) of the vertical signal line 32 is being clipped to (VclipH−VGS-M322) at the time of resetting [V32 (Rst)]. Therefore, the reset level is never lower than that, thereby being able to prevent the occurrence of a black sun phenomenon. Moreover, as is being clipped to (VclipL−VGS-M322) at the time of signal reading [V32(Sig)], the potential V32 of the vertical signal line 32 is not reduced down to a value smaller than that. As such, the drain-source voltage of the bias transistor M51 is not reduced down to a value outside of the range of operating the bias transistor M51 so that the highlight transverse stripe phenomenon can be prevented from occurring. Moreover, because the pixel P12 in the first row is in the same pixel section as the clipping-voltage-generation pixel P22 in the second row, their amplification transistors M312 and M322 are of the same size and have the same characteristics, and their gate-source voltages VGS-M312 and VGS-M322 thus do not vary that much. Accordingly, any possible variation of the clipping voltage can be reduced, and the effect of preventing the black sun phenomenon and the highlight transverse stripe phenomenon can be invariably observed.

Embodiment 2

Described next is a second embodiment. In this embodiment, a plurality of (N) pixels are used for generating the clipping voltage with the aim to reduce any possible variation of the gate-source voltage of an amplification transistor in a clipping-voltage-generation pixel by substantially increasing the gate area thereof, i.e., the variation of the gate-source voltage is in proportion to $1/\sqrt{N}$ (where N is the gate area of the transistor). As such, any possible variation of the gate-source voltage can be reduced on a column basis, thereby being able to provide a higher precision to the value of the clipping voltage.

Figure 10:
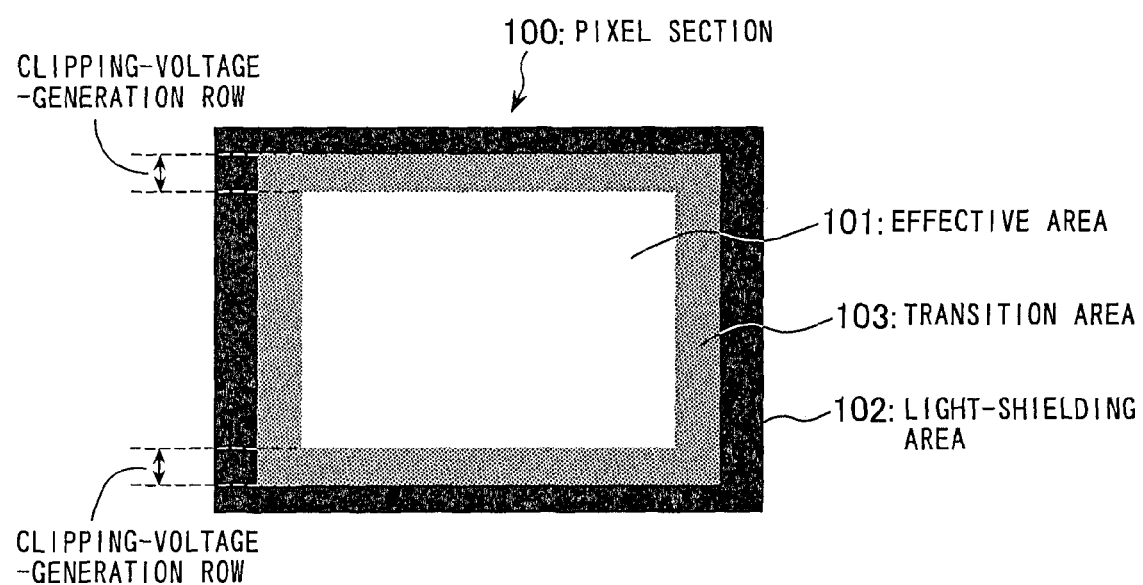
FIG. 10 is a diagram showing a plurality of clipping-voltage-generation pixel rows in a pixel section of a solid-state imaging apparatus of a second embodiment.
Figure 11:
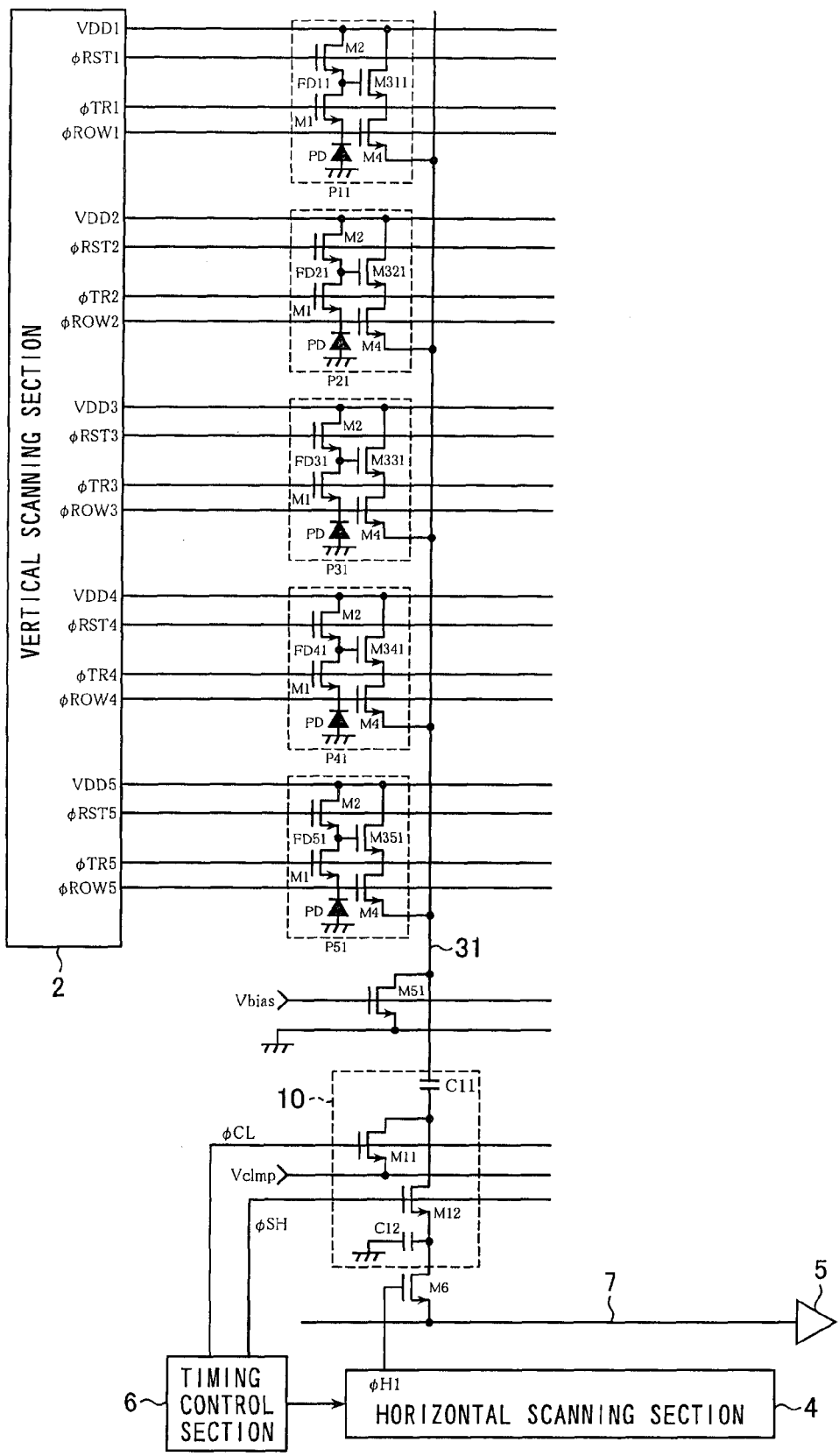
FIG. 11 is a partially-simplified circuit configuration diagram of the solid-state imaging apparatus of the second embodiment.

FIG. 10 shows the range of a pixel row of a plurality of pixels for use to generate the clipping voltage in the second embodiment. Exemplified in this example is a case of using the upper and lower portions of the transition area as an area for the row of generating the clipping voltage. FIG. 11 shows a specific exemplary circuit configuration diagram of the second embodiment, and therein, any component similar to or corresponding to that in the first embodiment of FIG. 8 is provided with the same reference numeral. In this embodiment, for simplicity, FIG. 10 shows only the portion of five pixels arranged in a column as a pixel section including a plurality of pixels arranged therein two dimensionally. The pixels P11, P21, P31, and P41 in the first to fourth rows are each used for generation of the clipping voltage, and the pixel P51 in the fifth row is used for signal reading.

Figure 12:
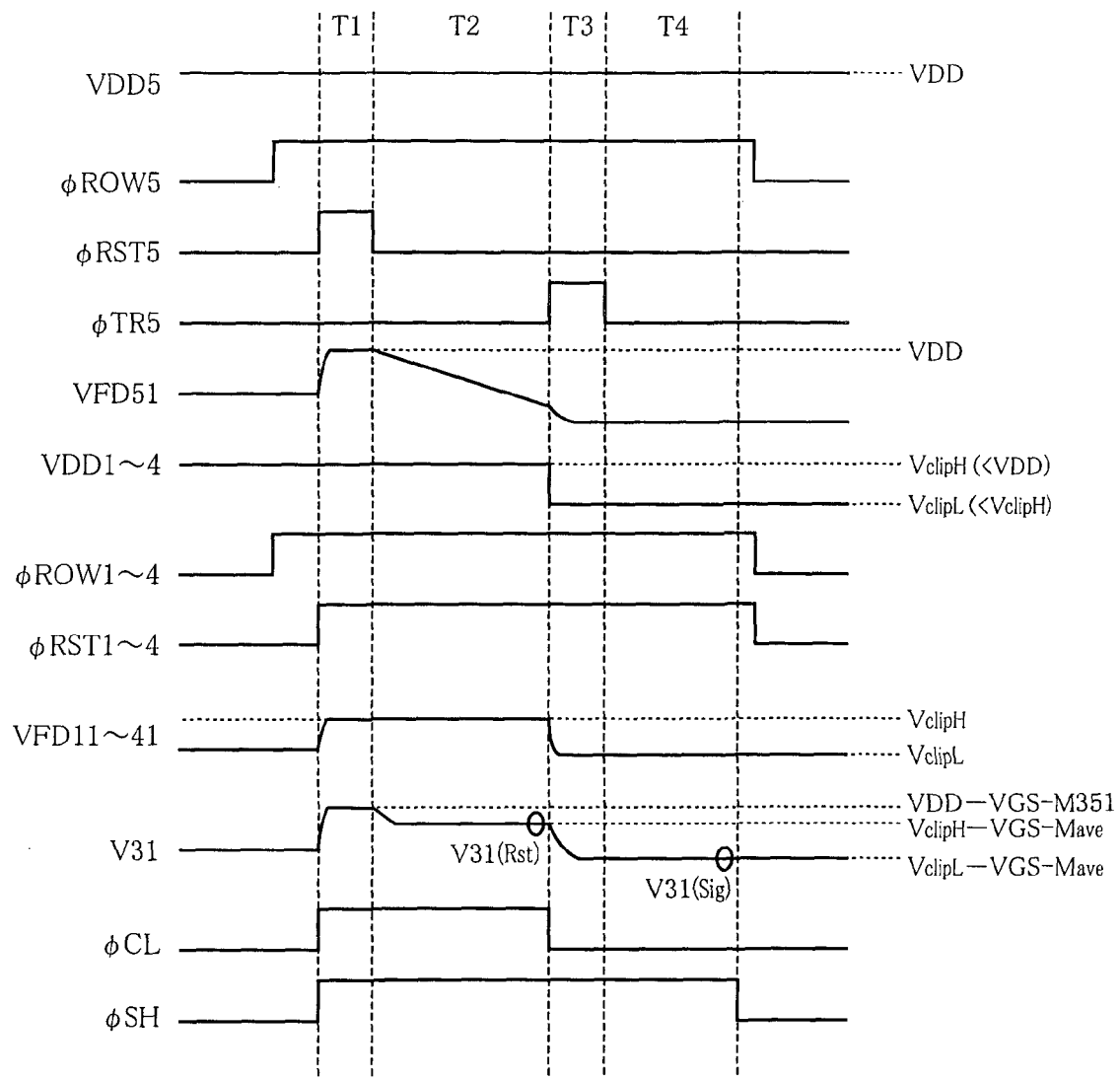
FIG. 12 is a timing chart for illustrating the operation of the solid-state imaging apparatus of the second embodiment of FIG. 11.

In the second embodiment with such a configuration, the basic operation of reading the image signal free from the black sun phenomenon and the highlight transverse stripe phenomenon is the same as that in the first embodiment, and FIG. 12 shows the timing chart for illustrating the operation. As is known from this timing chart, the clipping-voltage-generation pixels P11 to P41 in the first to fourth rows are operated at the same timing, thereby generating the first and second clipping voltages VclipH and VclipL. In the reset sampling period, the potential V31 of the vertical signal line 31 is clipped to [V31(Rst)=(VclipH−VGS-Mave)], and in the signal sampling period, is clipped to [V31(Sig)=(VclipL−VGS-Mave)], thereby preventing the black sun phenomenon and the highlight transverse stripe phenomenon from occurring. Note here that the term of VGS-Mave denotes the average value of the gate-source voltage of the amplification transistors M311 to M314 in the pixels when the four clipping-voltage-generation pixels P11 to P41 are used all at once to generate the clipping voltage.

In this case, the gates of the four amplification transistors of the pixels are coupled together, and this means the same as the gate area being increased. As described above, the variation of the gate-source voltage VGS is in proportion to $1/\sqrt{N}$ (where N is the gate area of the transistors, and in this embodiment, the same as the number of the rows N). Therefore, when the number of the pixel rows is increased for use to generate the clipping voltage, the possible variation of the gate-source voltage VGS is reduced in the potential of the vertical signal lines at the time of generation of the clipping voltage. In the case of this embodiment, because the four rows of pixels are used to generate the clipping voltage, the extent of the variation of the gate-source voltage VGS will be reduced to ½.

When the number of the pixel rows is increased for use to generate the clipping voltage, e.g., increased to 10, this leads to $1/\sqrt{(\text{gate area} \times 10)}$ being approximately equal to $1/[3 \times \sqrt{(\text{gate area})}]$. The extent of the variation of the gate-source voltage of the transistors is usually ±30 mV, and thus the resulting variation will be reduced to about ⅓, i.e., 10 mV. When the number of the pixel rows is increased to 25 for use to generate the clipping voltage, for example, this leads to $1/\sqrt{(\text{gate area} \times 25)}$ being approximately equal to $1/[5 \times \sqrt{(\text{gate area})}]$. The extent of the variation thus will be reduced to about ⅕, i.e., 6 mV. Ideally, increasing the number of rows as such will leave only the variation of the pixel amplifiers, i.e., amplification transistors. Note here that when a plurality of pixel rows are used to generate the clipping voltage, the combination of the pixel rows may be changed as appropriate.

Embodiment 3

Described next is a third embodiment. As shown in the first and second embodiment, when a single or a plurality of pixel rows are used to generate the clipping voltage, the pixel line(s) may include any defective pixel causing abnormal output. If such a defective pixel is used to generate the clipping voltage, the resulting clipping voltage cannot be appropriate in value, thereby resulting in a possibility of failing to serve the clipping function at the potential of the vertical signal lines. In consideration thereof, in this embodiment, information about the position of such a defective pixel is stored in a memory in advance, and for the clipping operation, the pixel line including the defective pixel may not be used to generate the clipping voltage.

Figure 13:
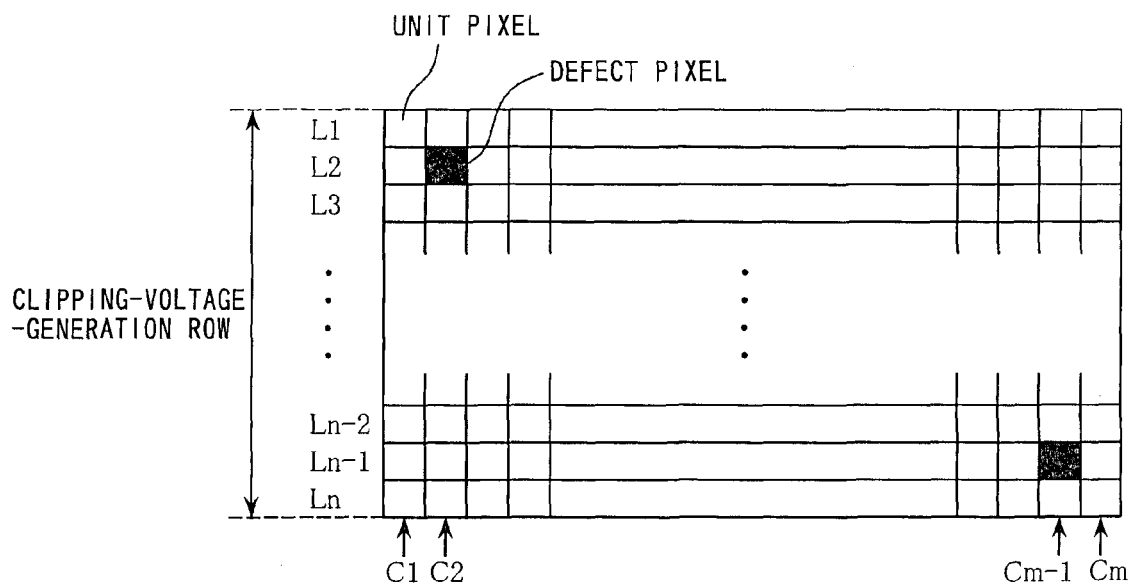
FIG. 13 is a diagram showing a clipping-voltage-generation pixel row in a pixel section of a solid-state imaging apparatus of a third embodiment.

FIG. 13 shows the clipping-voltage-generation pixel rows in a pixel section, i.e., rows L1 to Ln, and columns C1 to Cm, and the pixel at the row L2 and the column C2, and the pixel at the row Ln-1 and the column Cm-1 are both defective. In such a state, because the rows L2 and Ln-1 each include the defective pixel, if the rows L2 and Ln-1 are used as the pixel rows to generate the clipping voltage, the clipping voltage of the columns C2 and Cm-1 may be different in value from that of other rows due to the abnormal output of the defective pixels. Therefore, the rows L2 and Ln-1 each including a defective pixel are not used to generate the clipping voltage.

As such, in this embodiment, only normal pixels not causing abnormal output are used to generate the clipping voltage so that the clipping operation can be executed normally. Note here that the remaining basic operation in this embodiment is similar to that in the first or second embodiment, thereby being able to always prevent the black sun phenomenon and the highlight transverse stripe phenomenon from occurring without variation.

Embodiment 4

Described next is a fourth embodiment. In the solid-state imaging apparatus, there may be a case of reading only a part of the effective area in the pixel section, e.g., imaging with high definition. In such a mode with a reduced number of rows for signal reading, the number of rows not to be read is increased. In consideration thereof, in this embodiment, the resulting increased number of rows not to be read is used to generate the clipping voltage so that any possible variation of the gate-source voltage VGS can be reduced to a further extent in the amplification transistors at the time of generation of the clipping voltage.

Figure 14:
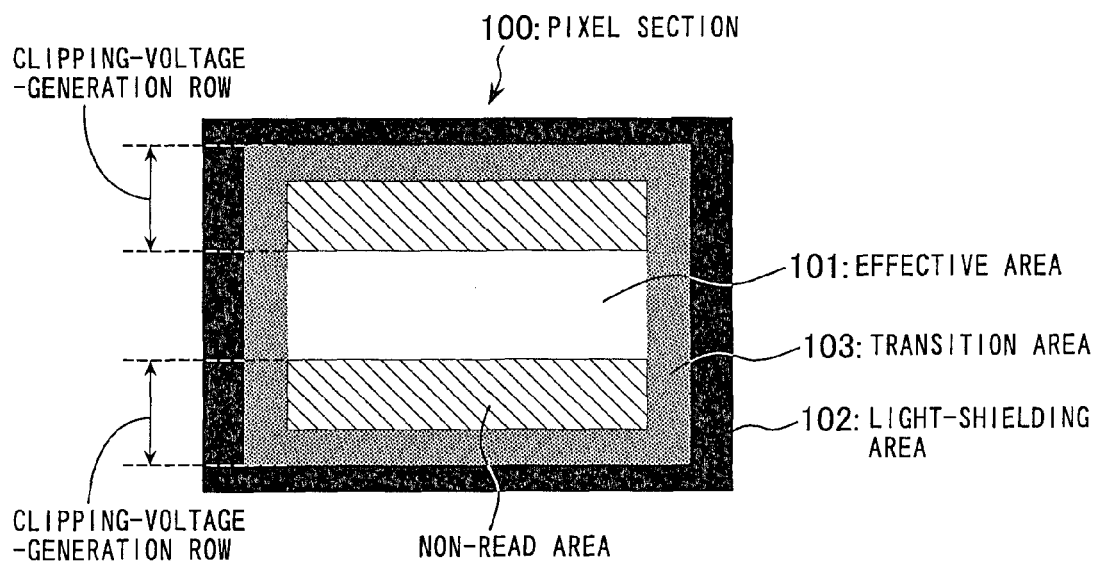
FIG. 14 is a diagram showing clipping-voltage-generation pixel rows in a pixel section of a solid-state imaging apparatus of a fourth embodiment.

FIG. 14 shows the pixel rows for use to generate the clipping voltage in a non-read area in the effective area of the pixel section in the mode with a reduced number of signal-read rows. In such an operation mode with a reduced number of signal-read rows, the non-read area in the effective area of the pixel section is used as a clipping-voltage-generation pixel row together with the transition area. This thus enables to reduce any possible variation of the gate-source voltage VGS in the amplification transistors at the potential of the vertical signal lines at the time of generation of the clipping voltage, thereby also being able to excellently prevent the black sun phenomenon and the highlight transverse stripe phenomenon from occurring. Note here that the basic operation of reading image signals free from the black sun phenomenon and the highlight transverse stripe phenomenon in this embodiment is the same as that in the second embodiment.

As described in the above embodiments, according to the first to fifth aspects of the invention, using an output of pixels included in the transition area disposed between the light-shielding area and the read area (effective area) in the pixel section, the output signal lines are clipped at the signal level of the pixels to prevent a highlight transverse stripe phenomenon from occurring. Accordingly, the resulting solid-state imaging apparatus becomes able to perform, with any possible variation being suppressed, the clipping operation of preventing a highlight transverse stripe phenomenon with no need to separately provide a clipping circuit.

According to the sixth to tenth aspects of the invention, an output of pixels included in the transition area disposed between the light-shielding area and the read area (effective area) in the pixel section is used to prevent a black sun phenomenon from occurring by clipping the reset level of the pixels to be output to the signal output lines. As such, the resulting solid-state imaging apparatus becomes able to perform, with any possible variation being suppressed, the clipping operation of preventing a black sun phenomenon with no need to separately provide a clipping circuit.

What is claimed is:

1. A solid-state imaging apparatus, comprising:
a pixel section including a two-dimensional matrix having a plurality of pixels, each pixel including photoelectric conversion means for converting an incident light into a signal charge, a storage section that stores therein the signal charge, transfer means for transferring the signal charge to the storage section, amplification means for amplifying the signal charge stored in the storage section for output as a pixel signal, and reset means for resetting the storage section through supply of a potential retained at a reset line to the storage section, on a column basis, an output signal line whose one end is coupled to one end of a constant-current source whose remaining end is grounded, and through which the pixel signal is output, in which the area carrying thereon the two-dimensional matrix of the pixels includes a light-shielding area with light shielding properties, a read area for reading a pixel signal corresponding to the incident light, and a transition area disposed between the light-shielding area and the read area; and
control means for selecting any of the pixels being coupled to the same output signal line and being in the read area as a first pixel, selecting any of the pixels being coupled to said the same output signal line and being in the transition area as a second pixel, resetting the second pixel by the reset means when outputting the pixel signal corresponding to the incident light from the first pixel to the output signal line, and performing control to keep the potential difference between the one end and the other end of the constant-current source in a range with which the constant-current source can be operated by using the pixel signal to be output to the output signal line from the second pixel at the time of resetting the second pixel.

2. The solid-state imaging apparatus according to claim 1, wherein the control means uses the pixel signal from a plurality of the second pixels to perform the control over the constant-current source to keep the potential difference thereof in the range.

3. The solid-state imaging apparatus according to claim 2, wherein the control means performs control to change the combination of the plurality of the second pixels for use to keep the potential difference of the constant-current source in the range.

4. The solid-state imaging apparatus according to claim 1, wherein the control means uses a pixel signal from the first pixel that is not a read target from the read area for the pixel signal corresponding to the incident light to perform the control over the constant-current source to keep the potential difference thereof in the range.

5. The solid-state imaging apparatus according to claim 1, wherein the control means controls the second pixel outputting the pixel signal to make the potential difference between the one end and the other end of the constant-current source to be a lower limit of the range with which the constant-current source can be operated.

6. A solid-state imaging apparatus comprising:
a pixel section including a two-dimensional matrix of a plurality of pixels, each pixel having photoelectric conversion means for converting an incident light into a signal charge; a storage section that stores therein the signal charge; amplification means for amplifying the signal charge stored in the storage section for output as a first output signal to a signal output line; and reset means for resetting the storage section through supply of a reset potential supplied to a reset line to the storage section, in which the area carrying thereon the two-dimensional matrix of the pixels includes a light-shielding area with light shielding properties, a read area for deriving the first output signal corresponding to the incident light, and a transition area disposed between the light-shielding area and the read area;
a noise suppression circuit that calculates a difference between the first output signal and a second output signal being an output to the signal output line as a result of a reset operation by the reset means in the same pixel outputting the first output signal, and performs a noise suppression operation to suppress any noise found in the first output signal; and
control means for performing control to set a lower limit value for the second output signal on the signal output line using a third output signal being an output to the signal output line as a result of the reset operation by the reset means in the second pixel found in the transition area coupled to the signal output line same as that for the first pixel, at the time of outputting the second output signal related to the first pixel included in the read area.

7. The solid-state imaging apparatus according to claim 6, wherein the control means sets a plurality of the second pixel for use as the second pixel.

8. The solid-state imaging apparatus according to claim 7, wherein the control means sets a plurality of the second pixel satisfying any predetermined requirements.

9. The solid-state imaging apparatus according to claim 6, wherein the control means sets the lower limit value for the second output signal on the signal output line also using a fourth output signal being an output to the signal output line as a result of the reset operation by the reset means in the first pixel that is included in the read area but is not a read target.

10. The solid-state imaging apparatus according to claim 6, wherein the control means sets a potential of the third output signal to be lower than a potential of the second output signal.

* * * * *